United States Patent

[11] 3,627,073

[72] Inventor  Larry L. Grimm
           Route 1, Box 1D, Cannon Falls, Minn. 55009
[21] Appl. No. 41,252
[22] Filed    May 28, 1970
[45] Patented Dec. 14, 1971

[54] SEAT FOR POWERED VEHICLE
     8 Claims, 4 Drawing Figs.
[52] U.S. Cl. .................................................. 180/82,
                                         180/5, 296/63, 297/195
[51] Int. Cl. ................................................. B60n 1/00
[50] Field of Search ...................................... 180/9.24,
                              82; 296/63, 65; 297/195, 384, 390

[56]              References Cited
                UNITED STATES PATENTS
2,330,341   9/1943   Du Pont et al. ............... 297/195
3,528,520   9/1970   Aaron ........................... 180/9.24

Primary Examiner—Benjamin Hersh
Assistant Examiner—Robert R. Song
Attorney—Wicks & Nemer ABSTRACT: A novel seat for powered, operator-guided vehicles which are arranged to travel over land is disclosed. The preferred embodiment of such a vehicle disclosed herein is a snowmobile which includes a chassis, a motor mounted on the chassis, treads driven by the motor and arranged to propel the vehicle, handle bars connected to rotatable front skis for guiding and steering the vehicle, and a generally flat operator seat mounted upon the chassis. Novel apparatus for aiding the operator in maintaining his position upon the operator seat is further disclosed including a vertically rising member arranged to attach to either the operator seat or the chassis, near the front of the operator seat and project above the operator seat. The vertical member is of a width which will allow the legs of an operator to fit around it. Two extensions project leftward and rightward from the top of the vertical member and are spaced from the top surface of the seat by a distance sufficient to allow the legs of the operator to fit between the seat and the projections. An operator may thus position his legs around the vertical member and under the projections to securely maintain his position in the operator seat.

Patented Dec. 14, 1971 3,627,073

INVENTOR.
LARRY L. GRIMM
BY
Hicks & Hemer
ATTORNEYS

SEAT FOR POWERED VEHICLE

BACKGROUND

The present invention relates to powered vehicles, more particularly to powered, operated guided vehicles, and still more particularly to a novel operator seat for powered, operator guided vehicles.

Operators of powered, guided vehicles have experienced problems in maintaining their position on or in such vehicles over rough terrain. For example, a snowmobile customarily has a flat seat, and the jostling and bouncing experienced by operators of snowmobiles have caused some of them to lose their balance and fall from a moving vehicle. An operator may thus incur injury and the uncontrolled moving snowmobile may do damage to property or other persons.

Further, an operator can be thrown forward upon the sudden stoppage of a snowmobile, as when a snowmobile strikes a fixed object such as a fence post, and again the operator may incur injury in being thrown from the vehicle.

Since the possibility of an emergency may arise in operating a snowmobile, any device for securely maintaining operator upon the vehicle must also allow the operator to leave it very rapidly. For example, in the event of an impending accident, with, for example a fence post or other obstruction, a snowmobile driver may be better protected by jumping from his vehicle.

Thus, the use of safety belts to securely maintain operator position has a serious deficiency in increasing the time necessary for an operator to leave his vehicle.

In an attempt to solve this problem in the past, some snowmobile seats have included pads attached to the seat which may be gripped by the operator with his knees. These pads have proven unsatisfactory for good maintenance of operator position because of the poor mechanical advantage offered and thus the lack of ability of the operator to maintain his position on a truly rough ride.

A further prior device used in an attempt to maintain operator position, is a stirruplike device upon the running board of the snowmobile. This technique also suffers from the disadvantage of having a poor mechanical advantage to maintain operator position. Further, this technique may cause an operator to break his toes if he is suddenly thrown forward upon hitting an obstruction.

SUMMARY

The present invention solves these and other problems experienced by operators of powered vehicles in maintaining their position on the vehicle by providing novel apparatus for aiding an operator in maintaining his position upon the operator seat of the vehicle.

In the preferred embodiment shown, the powered, operator-guided vehicle arranged for travel over land comprises a snowmobile. The snowmobile includes a chassis, a motor mounted on the chassis, and treads which are driven by the motor to propel the vehicle. Handlebars connected to pivotally arranged front skis allow an operator to steer and guide the vehicle.

Further, an operator seat is mounted upon the chassis and arranged to support the operator. The operator seat includes a portion arranged in a generally horizontal plane with respect to the surface of the land over which the vehicle moves to thus provide vertical support for the body of the operator. Projecting upward from the front of the operator seat is novel apparatus for aiding the operator in maintaining his position upon the seat. The apparatus first includes a vertical member arranged to attach to either the seat or the chassis of the vehicle, near the forward portion of the seat, and fit between the legs of an operator. The apparatus further includes a first horizontal member extending leftward from the top of the vertical member to thus extend in a direction generally perpendicular to the path of travel of the vehicle. This extension is spaced from the operator seat by a sufficient distance to allow the left leg of the operator to fit between the extension and the upper surface of the operator seat. A second horizontal member is arranged to extend rightward from the top of the vertical member again in a direction generally perpendicular to the path of travel of the vehicle. The second horizontal member is similarly spaced from the seat to allow the right leg of the operator to fit between the horizontal member and the upper surface of the operator seat. By use of the seat along with the novel apparatus, the operator can successfully maintain his position upon the seat.

In the preferred embodiment, the operator seat also includes a back for still better allowing the operator to maintain his position.

It is thus an object of the present invention to provide novel apparatus for aiding an operator of a powered, operator guided vehicle to maintain his position upon the operator seat.

It is a further object of the present invention to provide novel apparatus for aiding an operator of a powered, operator guided vehicle to maintain his position upon an operator seat and yet be free to quickly disengage himself from the vehicle and leave the vehicle.

It is further object of the present invention to provide apparatus for aiding the operator of a powered, operator guided vehicle to maintain his position upon the operator seat such that the operator has good mechanical advantage and thus may securely so maintain his position.

It is a further object of the present invention to provide novel apparatus for aiding an operator of a powered, operator guided vehicle in maintaining his position upon the operator seat in all possible directions.

These and further objects and advantages of the present invention will become clearer in the light of the following detailed description of an illustrative embodiment of this invention described in connection with the drawings.

DESCRIPTION

Figure 1:
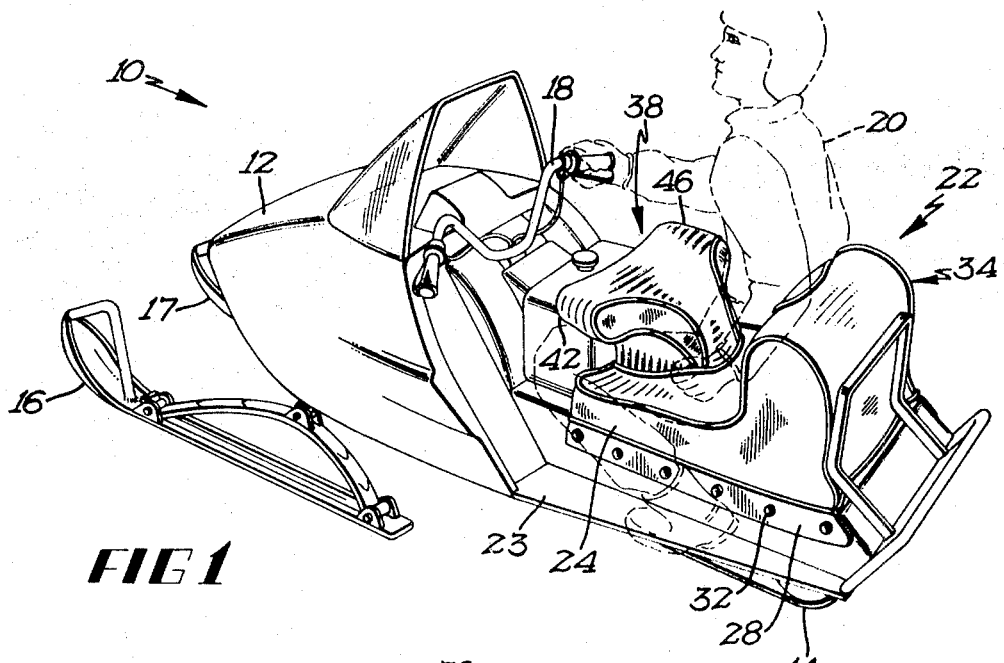
FIG. 1 shows a rear perspective view of a snowmobile, including an operator shown in phantom, where the snowmobile seat includes the novel apparatus according to the present invention.
Figure 2:
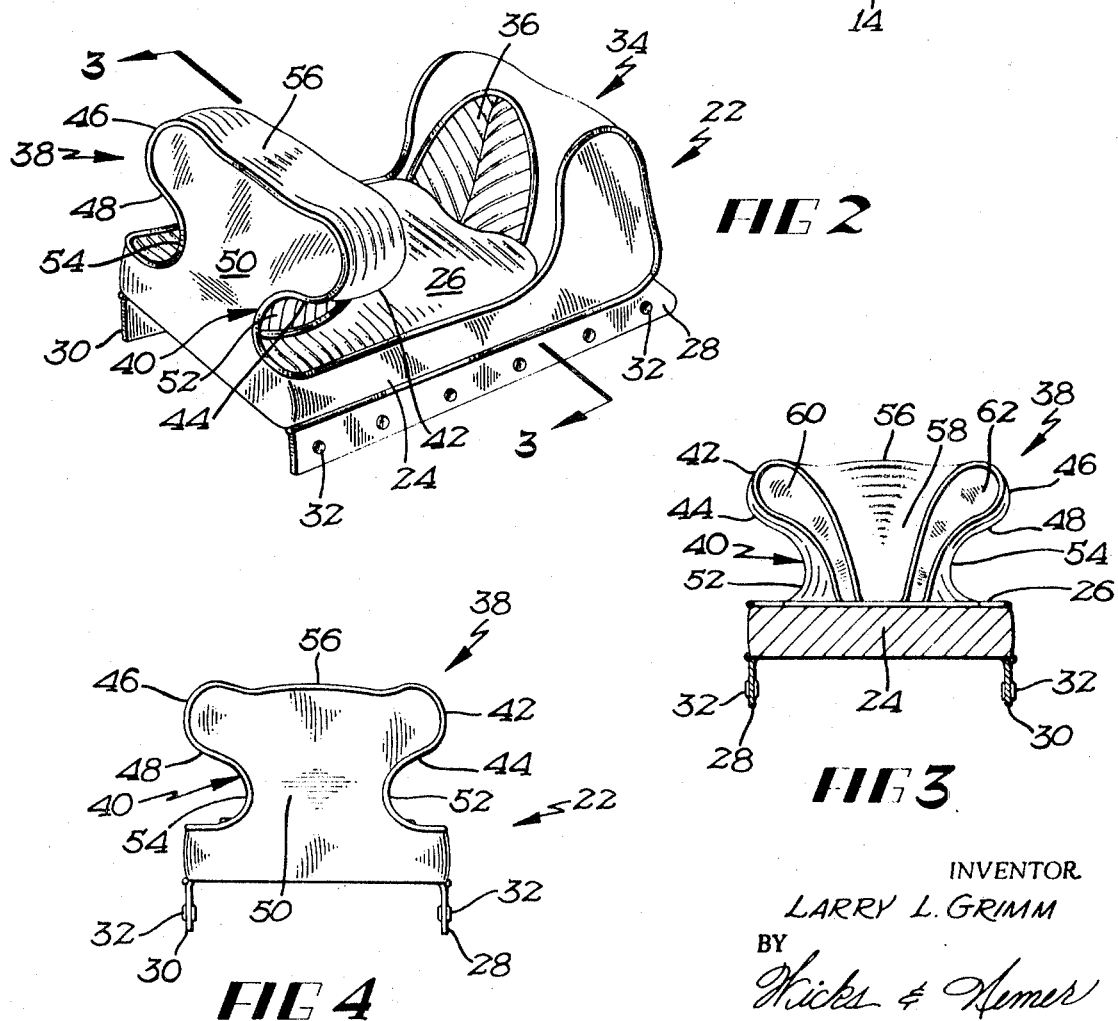
FIG. 2 shows a front perspective view of the operator seat of FIG. 1.

In FIG. 1, a powered, operator-guided vehicle arranged for travel over land is shown in the form of a snowmobile generally designated 10. Snowmobile 10 includes a chassis 12, a motor mounted upon the chassis, not specifically shown, and treads 14 receiving power from the motor to propel the snowmobile. Further, the snowmobile 10 includes a pair of skis 16 and 17 pivotally mounted adjacent the front of the vehicle and connected to a set of handlebars 18 for allowing an operator, shown in phantom and generally designated 20, to guide the snowmobile. Operator 20 is shown as seated upon an operator seat 22, mounted upon the chassis 12 to provide vertical support for the body of the operator 20, with his feet resting upon running boards 23.

Seat 22, which is also shown in the remainder of the figures, includes a main body portion 24 including a top surface 26 arranged in a generally horizontal plane with respect to the surface of the land over which the snowmobile is arranged to move to thus provide the vertical support for the body of the operator 20. A pair of flaps 28 and 30 descend from portion 24 and include a plurality of snaps 32 arranged to fasten the seat 22 to the chassis of snowmobile 10. Seat 22 is further shown to include a back portion 34 rising vertically upward from the surface 26 of portion 24, near the rear of seat 22. The back 34 includes a surface 36 which is generally perpendicular to the path of travel of the vehicle and to the plane of surface 26. While back 34 may be advantageously used in connection with the present invention, it is not necessary, as will be further explained.

Further rising vertically from the surface 26 of seat 22 is apparatus generally designated 38 which is arranged with respect to seat 22 to aid the operator 20 in maintaining his position upon the operator seat 22. Apparatus 38 includes a first vertically rising member 40 arranged with respect to the operator seat 22 to occupy a position adjacent the front of the operator seat 22 and project from surface 26 of portion 24 of that seat 22. The width of the vertical member 40 is sufficient to provide structural stability to the portion 40 and yet is narrow enough to allow the legs of operator 20 to fit around and about the vertical member 40, as best shown in FIG. 1.

As shown in all the figures, a first horizontal member 42 extends leftward from the top of vertical member 40, as respects operator 20, in a direction generally perpendicular to the path of travel of the vehicle. Left member 42 includes a bottom surface 44, best shown in FIGS. 3 and 4, which surface is spaced from the upper surface 26 of operator seat 22 by a distance at least sufficient to allow the left leg of operator 20 to pass between the bottom surface 44 of the left extension member 42 and the upper surface 26 of the operator seat 22. Similarly, a second horizontal member 46 extends rightward from the top of vertical member 40, as respects operator 20, in a direction generally perpendicular to the path of travel of the snowmobile 10. The second member 46 includes a bottom surface 48 again spaced from the upper surface 26 of the operator seat 22 by a distance at least sufficient to allow a leg, in this case the right leg, of operator 20, to pass between the bottom surface 48 of the second member 46 and the upper surface 26 of the operator seat 22. Thus the operator 20, as best shown in FIG. 1, may position his legs around and about the vertically rising member 40 and under the first and second extension members 42 and 46 to maintain his position in the operator seat 22, as will be further explained hereinafter.

Figure 3:
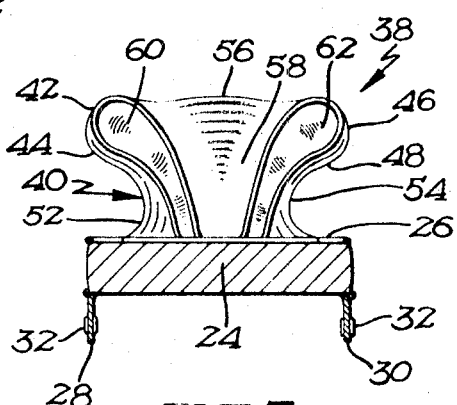
FIG. 3 shows a sectional view of the operator seat of FIG. 2 according to the section line 3—3 in FIG. 2.
Figure 4:
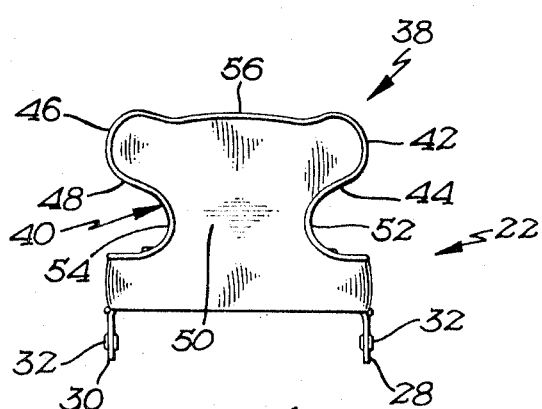
FIG. 4 shows a front elevation of the operator seat of FIGS. 1, 2, and 3.

As shown in the figures, apparatus 38 may be unitary with portion 24 of operator seat 22. Thus, apparatus 38 includes a flat surface 50 common with portion 24, which surface 50 faces forward of the snowmobile 10 as best seen in FIGS. 3 and 4. Surface 50 aids in the joinder and secure positioning of apparatus 38 to the remainder of seat 22.

To further aid in the joinder of apparatus 38 to seat 22, vertical member 40 includes left and right side surfaces, 52 and 54, respectively. Surfaces 52 and 54 extend from the surface 26 of operator seat 22 and merge in an integral fashion with a surface 56 covering both horizontal members 42 and 46.

Further, as best shown in FIG. 3, a curved operator facing surface 58 extends from the surface 26 of operator seat 22, curves towards the front of the snowmobile 10 away from the operator, and integrally joins with surface 56.

Still further, again as best seen in FIG. 3, two angled surfaces 60 and 62 interconnect the surface 58 with the side surfaces 52 and 54, respectively. Angled surfaces 60 and 62 allow the legs of operator 20 to better fit around and about the vertically rising member 40.

OPERATION

In using the apparatus of the present invention, an operator 20 positions and thus vertically supports himself upon surface 26 of seat 22 with his legs around and about vertically rising member 40 to thus position his left knee between surface 26 and extension 42 and under extension 42 and his right knee between surface 26 and extension 46 and under extension 46. The operator then positions his feet somewhat rearward of his knees and supported upon the running board 23 of snowmobile 10. It will be noticed that a wide range of differently proportioned operators may thus adjust to the present invention by varying the points at which the feet are placed upon the running board.

In this position, as can be seen from FIG. 1, a rapid stop of the snowmobile will tend to throw the body of operator 20 forward, and this forward motion will be resisted by surfaces 44 and 48 of extensions 42 and 46, respectively pressing on the thighs of operator 20. It is to be noticed that the operator will pivot about the points his feet contact running board 23 and will be restrained at a position above that point to thus provide excellent mechanical advantage for maintaining the operator within his seat.

Further, over bumpy terrain, the operator will be prevented from falling leftward by contact between the top of his knee or thigh and surface 48 of projection 46, and he will further be prevented from falling rightward by contact between the upper portion of his knee or thigh, and surface 44 of projection 42.

Still further, the operator will be prevented from tipping backwards or bouncing straight up by the upward pressure of his knees or thighs against the surfaces 44 and 48 of projections 42 and 46, respectively.

Thus, it can now be appreciated that the novel operator seat of the present invention provides apparatus for maintaining the operator in his position upon the operator seat.

It is to be further noticed that back 34 is not necessary, however back 34 allows the operator to better maintain his position since he may effectively wedge himself between the back and apparatus 38 to quite securely maintain his position.

Now that the basic teachings of the present invention have been explained, many extensions and variations will be obvious to one having ordinary skill in the art. For example, the apparatus 38 has been shown as a unitary member. It will be realized that apparatus 38 may be formed from several individual pieces within the teachings of the present invention.

Also, apparatus 38 has been shown as unitarily joined with seat 22. This is not necessary. Apparatus 38 may be constructed as a separate piece which can then be affixed to the seat 22 or attached directly to chassis 12.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is indicated by the appended claims, rather than by the foregoing description, and all changes which come within the meaning and range of equivalency of the claims are intended to be embraced therein.

What is claimed is:

1. In a powered, operator-guided vehicle arranged for travel over land including a chassis, a motor mounted upon the chassis, means receiving power from the motor and arranged to propel the vehicle, means for guiding the vehicle, and an operator seat mounted upon the chassis, the operator seat having at least a main body portion arranged in a generally horizontal plane with respect to the surface of the land to provide vertical support for the body of the operator, apparatus for aiding the operator in maintaining his position upon the operator seat, comprising: a member vertically rising from the operator seat of the vehicle to allow at least a portion of the vertical member to extend above the operator seat, the vertical member further arranged with respect to the operator seat to occupy a position adjacent the front of the operator seat, and the vertical member being of such width as to allow the legs of an operator to fit around the vertical member; a first horizontal member extending from the top of the vertical member in a direction generally perpendicular to the path of travel of the vehicle and having a bottom surface spaced from the upper surface of the operator seat by a distance at least sufficient to allow a first leg of an operator to pass between the bottom surface of the first horizontal member and the upper surface of the operator seat; a second horizontal member extending from the top of the vertical member in a direction generally perpendicular to the path of travel of the vehicle and opposite from the direction of extension of the first horizontal member, the second horizontal member having a bottom surface spaced from the upper surface of the operator seat by a distance at least sufficient to allow a second leg of an operator to pass between the bottom surface of the second horizontal member and the upper surface of the operator seat to thus allow an operator to position his legs around and about the vertically rising member and under the first and second horizontally extending members to maintain his position in the operator seat.

2. The apparatus of claim 1, wherein the operator seat further includes a back having a surface which is generally perpendicular to the path of travel of the vehicle and to the plane of the main body portion and spaced from the vertically rising member by a distance sufficient to allow the body of an operator to be positioned between the back and the vertically rising member such that an operator may wedge himself between the back and the vertically rising member and more securely maintain his position upon the operator seat.

3. The apparatus of claim 2, wherein the vertically rising member comprises: a curved operator facing surface at least extending from the operator seat to the first and second horizontal members, the front surface curving away from the operator; two side surfaces extending at least from the operator seat to the first and second horizontal members; and two angled surfaces interconnecting the operator facing surface to the side surface and allowing a better fit of the legs of the operator around and about the vertically rising member.

4. The apparatus of claim 3, wherein the vertically rising member, the first horizontal member, and the second horizontal member are unitarily joined.

5. The apparatus of claim 4, wherein the first vertically rising member is arranged to attach to the operator seat.

6. The apparatus of claim 1, wherein the vertically rising member comprises: a curved operator facing surface at least extending from the operator seat to the first and second horizontal members, the front surface curving away from the operator; two side surfaces extending at least from the operator seat to the first and second horizontal members; and two angled surfaces interconnecting the operator facing surface to the side surface and allowing a better fit of the legs of the operator around and about the vertically rising member.

7. The apparatus of claim 1, wherein the vertically rising member is arranged to attach to the operator seat.

8. The apparatus of claim 1, wherein the vertically rising member, the first horizontal member and the second horizontal member are unitarily joined.

* * * * *